US012801251B2

(12) United States Patent
Brandt et al.

(10) Patent No.: US 12,801,251 B2
(45) Date of Patent: Nov. 17, 2026

(54) TOUCH PANEL DISPLAY UNIT HAVING HAPTIC FEEDBACK

(71) Applicant: Harman Becker Automotive Systems GmbH, Karlsbad-Ittersbach (DE)

(72) Inventors: Peter Brandt, Pfinztal (DE); Joerg Welke, Ettlingen-Schöllbronn (DE); Hui Rao, Shanghai (CN)

(73) Assignee: Harman Becker Automotive Systems GmbH, Karlsbad-Ittersbach (DE)

( * ) Notice: Subject to any disclaimer, the term of this patent is extended or adjusted under 35 U.S.C. 154(b) by 0 days.

(21) Appl. No.: 19/272,512

(22) Filed: Jul. 17, 2025

(65) Prior Publication Data

US 2025/0341931 A1 Nov. 6, 2025

Related U.S. Application Data

(63) Continuation of application No. PCT/US2023/013103, filed on Feb. 15, 2023.

(51) Int. Cl.

| | |
|---|---|
| ***G06F 3/044*** | (2006.01) |
| ***G06F 1/16*** | (2006.01) |
| ***G06F 3/01*** | (2006.01) |
| ***G06F 3/041*** | (2006.01) |

(52) U.S. Cl.

CPC .......... *G06F 3/0447* (2019.05); *G06F 1/1656* (2013.01); *G06F 3/016* (2013.01); *G06F 3/0416* (2013.01)

(58) Field of Classification Search

CPC ...... G06F 3/0447; G06F 1/1656; G06F 3/016; G06F 3/0416

See application file for complete search history.

(56) References Cited

U.S. PATENT DOCUMENTS

2018/0157353 A1* 6/2018 Sleeman .............. H03K 17/975
2021/0066574 A1* 3/2021 Diest .................... H10N 30/503

* cited by examiner

*Primary Examiner* — Robert J Michaud
(74) *Attorney, Agent, or Firm* — Burris Law, PLLC

(57) ABSTRACT

A touch panel display unit that includes a front housing and an electrode assembly. The front housing includes a touch surface configured to be displaced in response to a force acting on the touch surface. The electrode assembly is configured to detect displacement of the touch surface and provide dampening in response to a displacement of the touch surface. The electrode assembly includes a deformable electrode defining a cavity filled with a pressurized fluid.

20 Claims, 6 Drawing Sheets

TOUCH PANEL DISPLAY UNIT HAVING HAPTIC FEEDBACK

FIELD

The present disclosure relates to a touch panel display unit having haptic feedback.

BACKGROUND

The statements in this section merely provide background information related to the present disclosure and may not constitute prior art.

In some applications, for example, in game consoles, mobile telephones, and automobiles, touch-sensitive display screens (touch displays) or other input elements having surfaces provided to be touched (touch surfaces) are used in which a haptic (tactile) feedback is provided after a corresponding touch by the user. This haptic feedback takes place, for example, by movement of the touch surface, for example, by shaking or vibrating. A drive unit provides this movement, which is mechanically coupled in a suitable way to the touch surface to transmit vibrations generated by the drive unit to the touch surface. Such a drive unit can be controlled, for example, by an electronic control unit in dependence on a detected touch of the touch surface. Such a drive system can comprise, for example, a piezoactuator.

Such a display unit having haptic feedback may include one or more dampening components to provide a restoring force in response to operation of the drive unit. The restoring force provided by the dampening components is to take place uniformly over the entire touch surface.

SUMMARY

This section provides a general summary of the disclosure and is not a comprehensive disclosure of its full scope or all of its features.

In one form, the present disclosure provides a touch panel display unit that includes a front housing and an electrode assembly. The front housing includes a touch surface configured to be displaced in response to a force acting on the touch surface. The electrode assembly is configured to detect displacement of the touch surface and provide dampening in response to a displacement of the touch surface. The electrode assembly includes a deformable electrode defining a cavity filled with a pressurized fluid.

In variations of the touch panel display of the above paragraph, which can be implemented individually or an any combination: the fluid is pressurized air; the deformable electrode includes a flat wall and an arcuate wall, the arcuate wall is engaged with the front housing; the electrode assembly includes a sensing electrode located between the arcuate wall of the deformable electrode and the front housing, the sensing electrode engaging the arcuate wall and the front housing; when the touch surface is displaced, the deformable electrode is moved from a rest position in which a first area of the arcuate wall engages the sensing electrode to a deformable position in which a second area of the arcuate wall engages the sensing electrode, the second area being greater than the first area; a rear housing includes a first recess formed in a first surface thereof, the front housing includes a second recess formed in a second surface that faces the first surface, the deformable electrode is located partially in the first recess and the sensing electrode is located entirely in the second recess; the deformable electrode is made of an elastomeric conductive foam; a rear housing is secured to the front housing, the deformable electrode is located at a periphery of the front and rear housings; a drive unit is configured to displace the touch surface in response to the force acting on the touch surface; the drive unit comprises a piezo actuator; a rear housing is secured to the front housing, the front and rear housings cooperate with each other to define a first compartment and a second compartment that surrounds the first compartment, the drive unit disposed in the first compartment and the deformable electrode disposed in the second compartment; a rear housing is secured to the front housing, the rear housing includes a first recess formed in a first surface and the front housing includes a second recess formed in a second surface that faces the first surface, the deformable electrode is located partially in the first and second recesses; and the deformable electrode extends around an entire periphery of the front housing.

In another form, the present disclosure provides a touch panel display unit that includes a rear housing, a front housing, and an electrode assembly. The front housing cooperates with the rear housing to define a first compartment and a second compartment that surrounds the first compartment. The front housing includes a touch surface configured to be displaced in response to a force acting on the touch surface. The electrode assembly is disposed within the second compartment. The electrode assembly is configured to detect displacement of the touch surface and provide dampening in response to a displacement of the touch surface. The electrode assembly includes a deformable electrode and a sensing electrode. The deformable electrode includes a flat wall engaged with the rear housing and an arcuate wall. The deformable electrode also defines a cavity filled with a pressurized fluid. The sensing electrode is located between the arcuate wall of the deformable electrode and the front housing. The sensing electrode engages the arcuate wall and the front housing.

In variations of the touch panel display of the above paragraph, which can be implemented individually or an any combination: the pressurized fluid is pressurized air; a drive unit is disposed within the first compartment and is configured to displace the touch surface in response to a force being applied to the touch surface; the deformable electrode is made of an elastomeric conductive foam; the rear housing includes a first recess formed in a first surface and the front housing includes a second recess formed in a second surface that faces the first surface, the first recess and the second recess cooperate with each other to define the second compartment when the rear housing and the front housing are connected to each other; and when the touch surface is displaced, the deformable electrode is moved from a rest position in which a first area of the arcuate wall engages the sensing electrode to a deformable position in which a second area of the arcuate wall engages the sensing electrode, the second area being greater than the first area.

In yet another form, the present disclosure provides a touch panel display unit that includes a rear housing, a front housing, a drive unit, and an electrode assembly. The rear housing includes a first recess formed in a first surface. The front housing includes a second recess formed in a second surface that faces the first surface. The front housing includes a touch surface configured to be displaced in response to a force acting on the touch surface. The drive unit is configured to displace the touch surface in response to the force acting to the touch surface. The electrode assembly is located between the rear and front housings. The electrode assembly is configured to detect displacement of the touch surface and provide dampening in response to a displacement of the touch surface. The electrode assembly includes a deformable electrode and a sensing electrode. The deformable electrode is partially disposed within the first recess and made of an elastomeric conductive foam. The deformable electrode includes a flat wall engaged with the rear housing and an arcuate wall. The flat wall and the arcuate wall cooperate with each other to define a cavity filled with pressurized air. The sensing electrode is disposed within the second recess and is located between and engaging the arcuate wall of the deformable electrode and the front housing. When the touch screen is displaced, the deformable electrode is moved from a rest position in which a first area of the arcuate wall engages the sensing electrode to a deformable position in which a second area of the arcuate wall engages the sensing electrode. The second area being greater than the first area.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
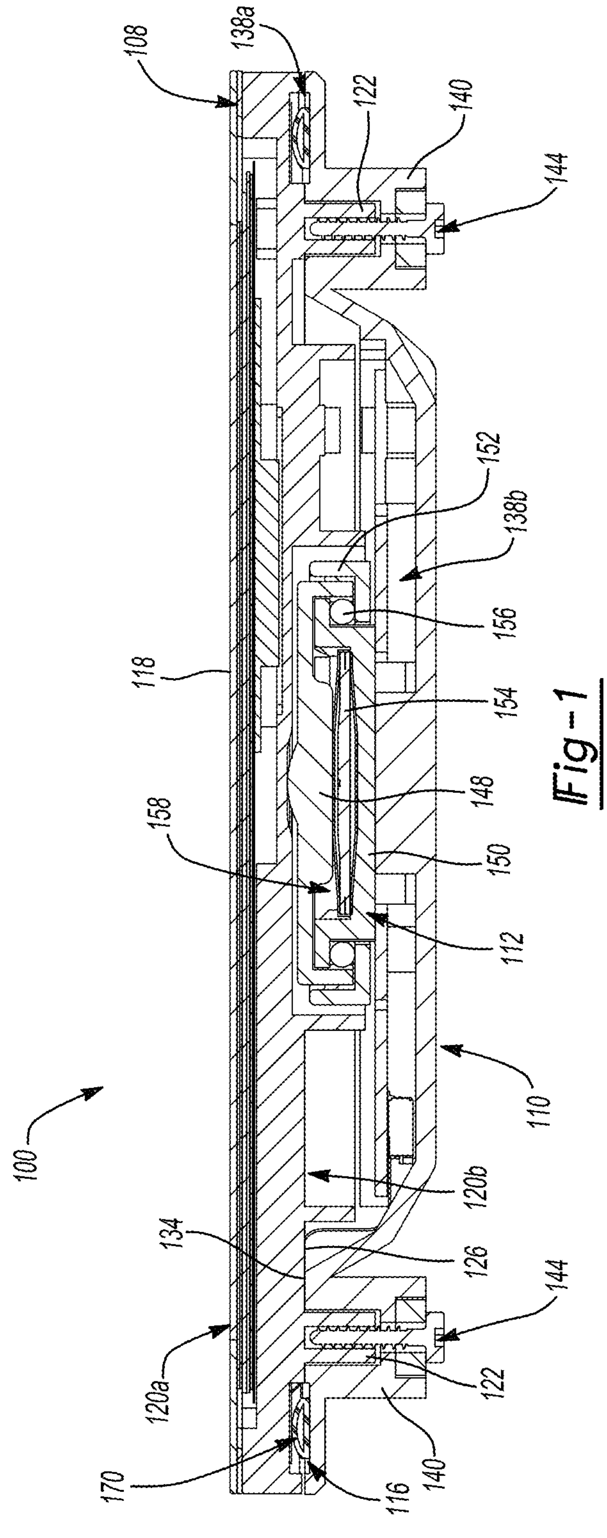
FIG. 1 is a cross-sectional view of a touch panel display unit having an electrode assembly in accordance with the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to a touch panel display unit that includes a touch surface and an electrode assembly. The touch surface is configured to be displaced in response to a force acting on the touch surface. The electrode assembly includes a deformable electrode that is filled with pressurized fluid. In this way, the electrode assembly is configured to detect displacement of the touch surface and provide dampening in response to a displacement of the touch surface.

Figure 2:
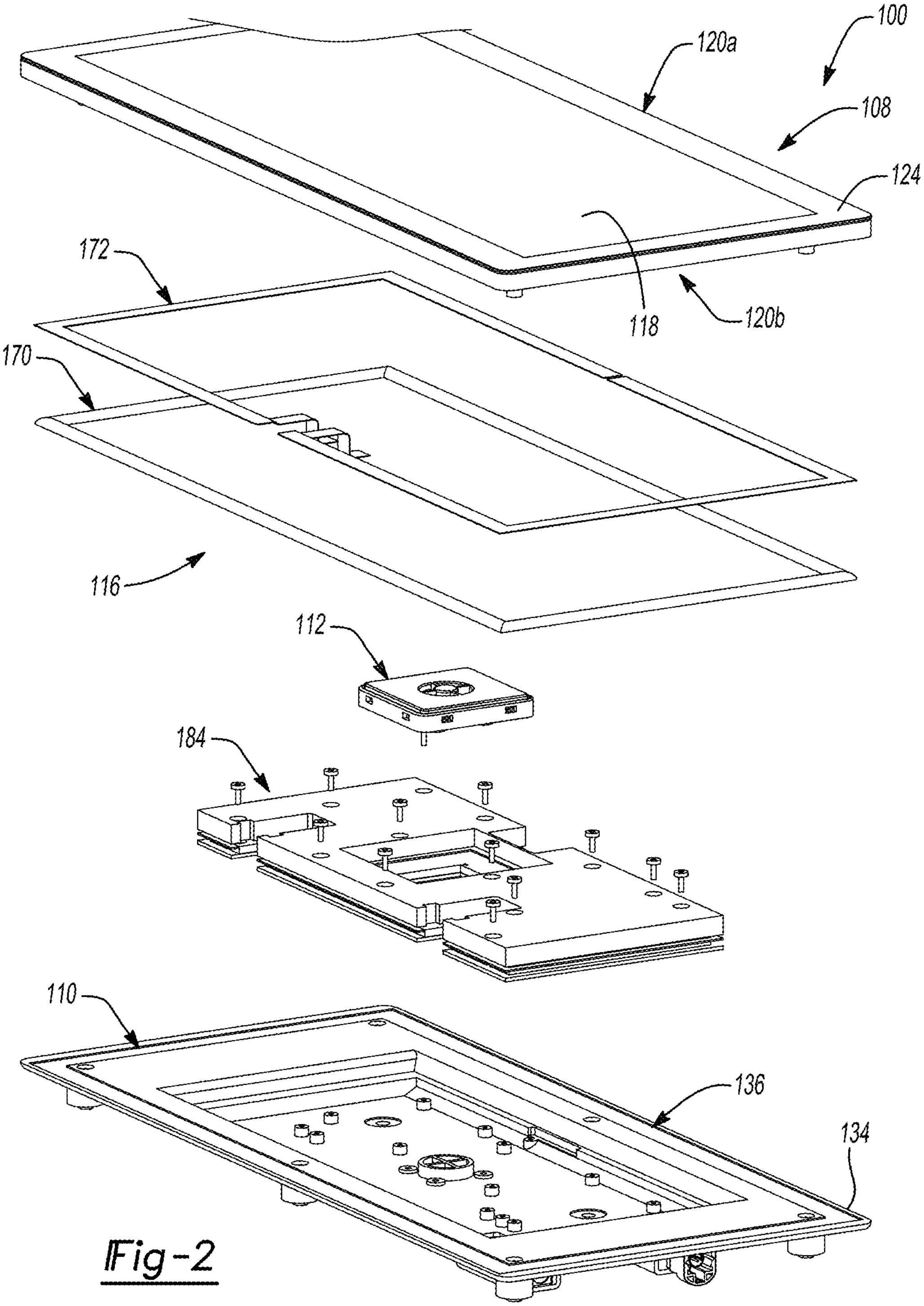
FIG. 2 is an exploded perspective view of the touch panel display unit of FIG. 1.
Figure 3:
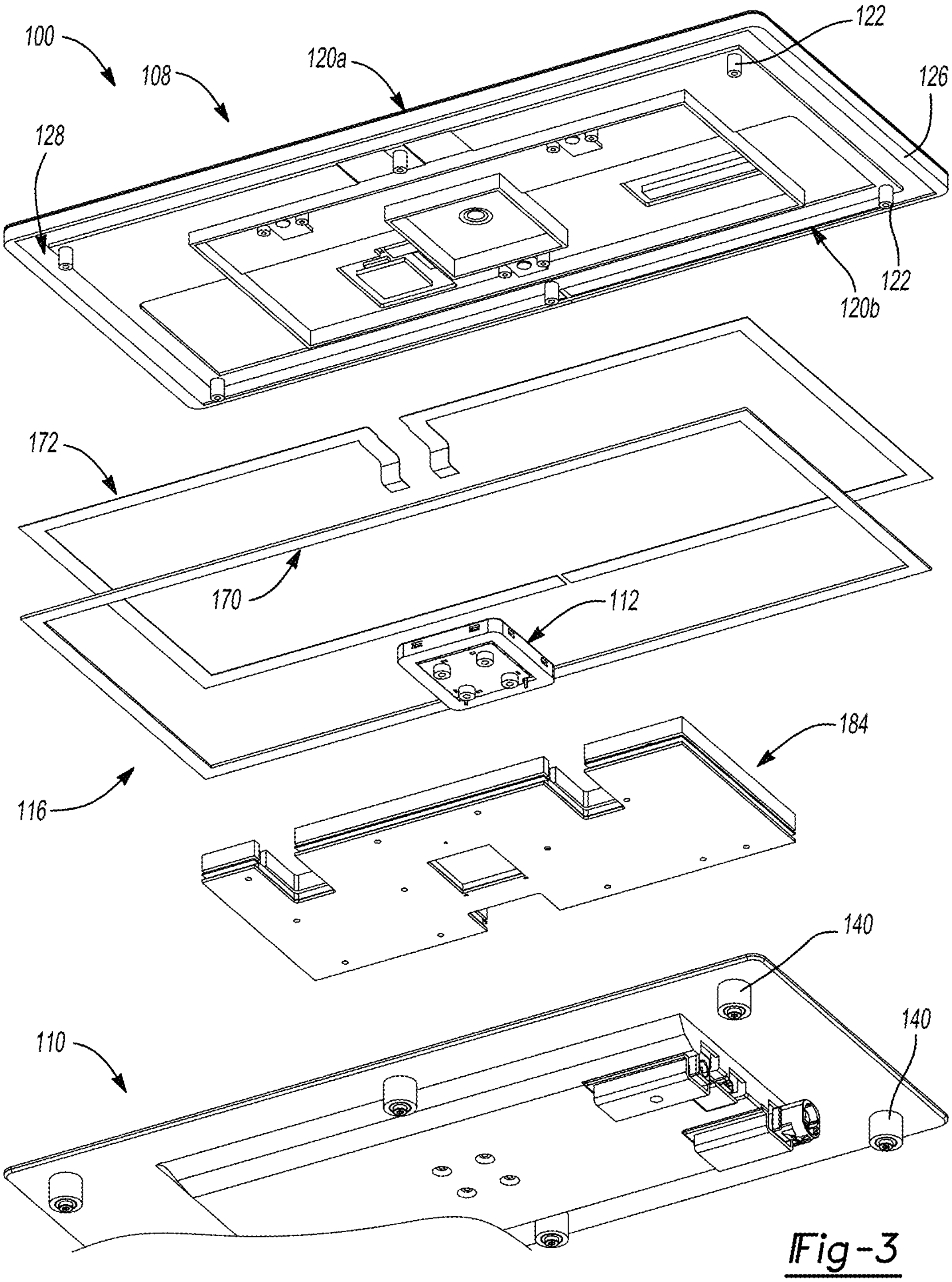
FIG. 3 is another exploded perspective view of the touch panel display unit of FIG. 1.
Figure 7:
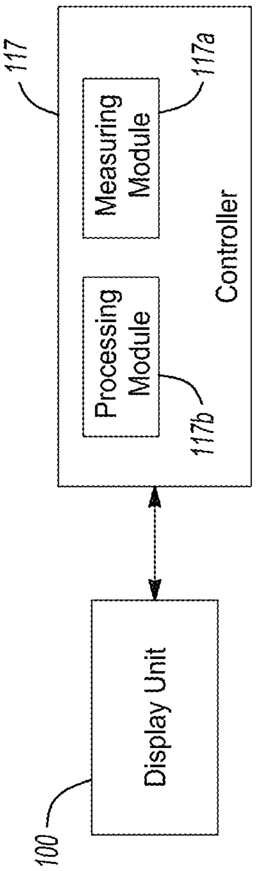
FIG. 7 is a functional block diagram of an example touch panel display unit in accordance with the principles of the present disclosure.

With reference to FIGS. 1-3, a touch panel display unit 100 according to one embodiment of the present disclosure is provided. The display unit 100 may be secured to a fixed base (not shown) and includes a front housing 108, a rear housing 110, a drive unit 112, an electrode assembly 116, and a controller 117 (FIG. 7). Forces may act on the display unit 100. That is, a force $F_{finger}$, which is caused by the finger of a user (not shown), for example, may act on the display unit 100 when the user presses on an element displayed on a touchscreen or touch surface 118 of the front housing 108 for operation. A force $F_{actuator}$, which is generated as haptic feedback for the user by the drive unit 112, may act on the display unit 100 in response to the force $F_{finger}$. In addition, a force $F_{Damping}$ representing one or more damping components may act on the display unit 100 for dampening mechanical oscillations of the movement of the touch surface 118 and/or the drive unit 112. In this way, the force $F_{actuator}$ equals the $F_{finger}$ plus $F_{Damping}$ (i.e., $F_{actuator}=F_{Damping}+F_{finger}$).

With reference to FIGS. 1-3, the front housing 108 includes the touchscreen 118 (FIGS. 1 and 2) at a front side 120*a* thereof, which is opposite a rear side 120*b* thereof. As described above, the touchscreen 118 is configured to be displaced relative to the rear housing 110 in response to a force acting on the touchscreen 118. In one embodiment, the touchscreen 118 is flush with a front surface 124 (FIG. 2) of the front housing 108. In another embodiment, the touchscreen 118 is offset relative to the front surface 124 of the front housing 108. In one embodiment, the touchscreen 118 is made of a non-conductive material such as glass or plastic, for example. In the example illustrated, the touchscreen 118 is transparent. In another configuration, the touchscreen 118 may be opaque.

In one embodiment, the front housing 108 includes connectors 122 (FIGS. 1 and 3) at the rear side 120*b*. The connectors 122 extend from a rear surface 126 of the front housing 108 toward the rear housing 110. The connectors 122 are also positioned inwardly relative to a recess 128 formed in and around the rear surface 126 of the front housing 108. Stated differently, the recess 128 formed in and entirely around the rear surface 126 is located closer toward a periphery of the front housing 108 than the connectors 122. Each connector 122 includes an opening extending at least partially therethrough. In some forms, the opening 130 optionally includes internal threads.

The rear housing 110 cooperates with the front housing 108 to form multiple compartments that are separate from each other and that house the drive unit 112, a Printed Circuit Board 184 (PCB), and the electrode assembly 116. The rear housing 110 includes a surface 134 (FIGS. 1 and 2) that faces the rear surface 126 of the front housing 108. The surface 134 defines a recess 136 formed in and entirely around the surface 134 and is aligned with the recess 128 of the front housing 108. In this way, a compartment 138*a* is formed in the display unit 100 that surrounds compartment 138*b* (FIG. 1). Stated differently, the compartment 138*a* is located closer toward a periphery of the display unit 100 than compartment 138*b*. Additionally, the compartment 138*a* is configured to house the electrode assembly 116 while the compartment 138*b* is configured to house the drive unit 112 and the PCB 184.

In one embodiment, the rear housing 110 also includes connectors 140 (FIGS. 1 and 3) that extend from a rear side thereof away from the front housing 108 and are positioned between the compartments 138*a*, 138*b*. Each connector 140 includes an opening that receives a respective connector 122 of the front housing 108. In this way, fasteners 144 (FIG. 1)

such as bolts, screws, or rivets, for example, may extend through the connectors 122, 140 of the front and rear housings 108, 110, respectively, to secure the front and rear housings 108, 110 to each other and form the compartments 138*a*, 138*b*. It should be understood that the connectors 122, 140 may cooperate in other ways to secure the front and rear housings 108, 110 to each other, such as via interlocking clips, or adhesives for example.

With reference to FIGS. 1-3, the drive unit 112 is located at a middle portion of the display unit 100 (i.e., in the compartment 138*b*) and provides haptic feedback. As shown in FIG. 1, the drive unit 112 includes a first housing 148, a second housing 150, a third housing 152, and an actuator 154. The first housing 148 is mechanically coupled to the touchscreen 118. The second housing 150 is mounted between the rear housing 110 and the first housing 148 and floats relative to the first housing 148. The third housing 152 is secured to the first housing 148 and may have a shape that corresponds to the shapes of the first and second housings 148, 150. The actuator 154 is in mechanical contact with the first housing 148 such that a force generated by the actuator 154 may be transmitted to the first housing 148.

In one embodiment, the actuator 154 is a piezoelectric actuator or piezoactuator. The piezoelectric actuator may have multiple layers of piezoelectric material which are mechanically stacked and electrically connected in parallel in order to achieve greater movement amplitudes. The actuator 154 is located in a cavity 158 between the first housing 148 and the second housing 150, and is mechanically coupled at one side to the first housing 148 and on the opposite side to the second housing 150. The actuator 154 is also housed in a structure formed by the housings 148, 150, 152. The shape and formation of the structure formed by the housings 148, 150, 152 provides a sound absorbing structure, which inhibits the transmission of sound by the actuator 154 external to the structure.

An elastic element 156 is located between the first and second housings 148, 150 and generates a restoring force in response to a compression of the elastic element 156 based on a corresponding deflection of the actuator 154. The elastic element 156 sets an operating position of the second housing 150 and thus the actuator 154. In one embodiment, the elastic element 156 may be made of elastic material such as rubber and may take the form of an O-ring or gasket. In this way, the elastic element 156 may also act as a seal to inhibit fluid and debris from entering into the cavity 158 housing the actuator 154.

In one embodiment, the elastic element 156 is filled with pressurized fluid such as pressurized air, for example, which determines the elasticity or damping properties of the elastic element 156, though other configurations can be used such as solid material for example. One example of such drive unit is disclosed in U.S. patent application Ser. No. 17/869,209, and titled "DISPLAY ELEMENT HAVING VARIABLE DAMPING," which is commonly owned with the present application and the contents of which are incorporated herein by reference in its entirety.

Figure 4:
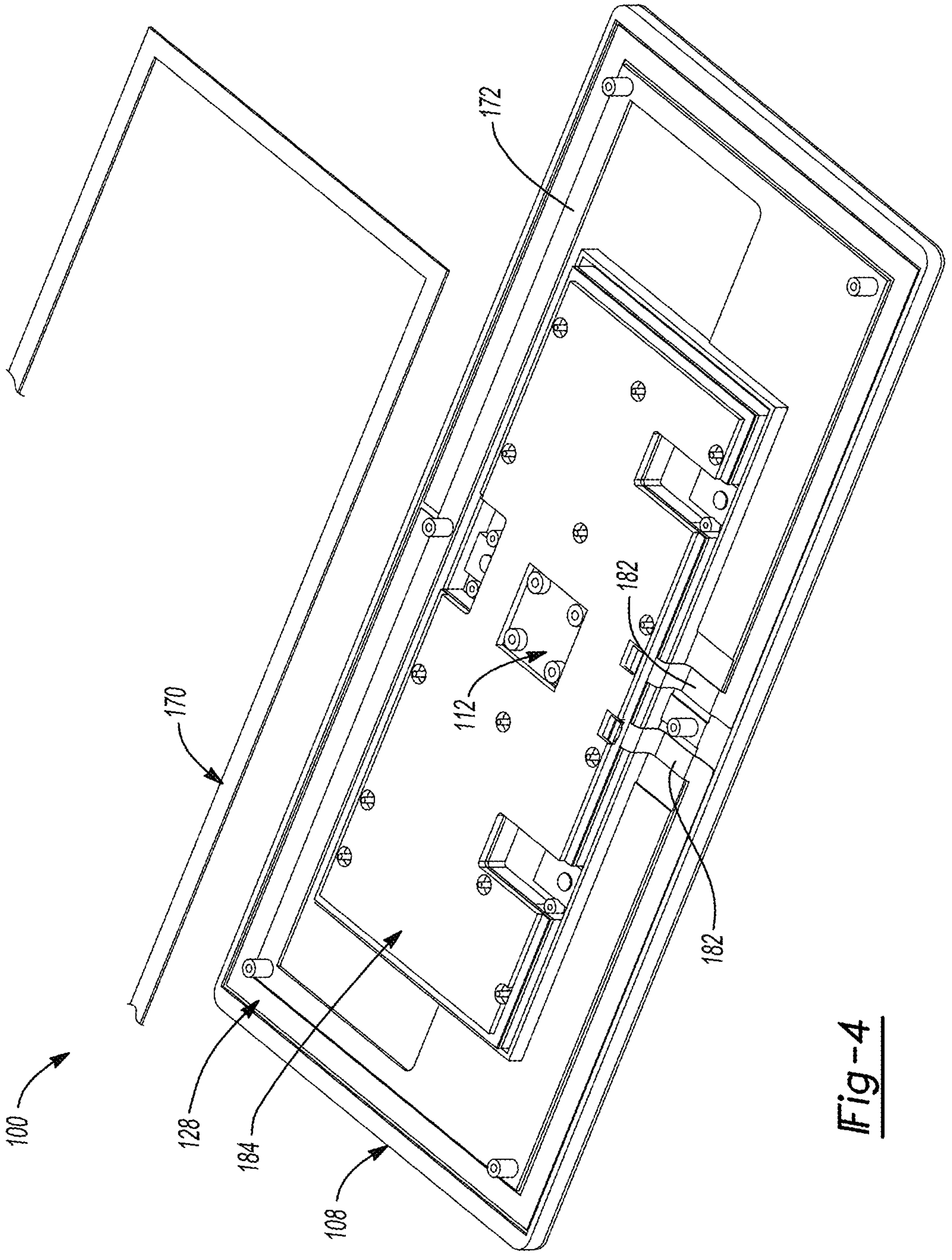
FIG. 4 is a rear perspective view of the touch panel display unit of FIG. 1 with a rear housing removed for clarity.
Figure 5:
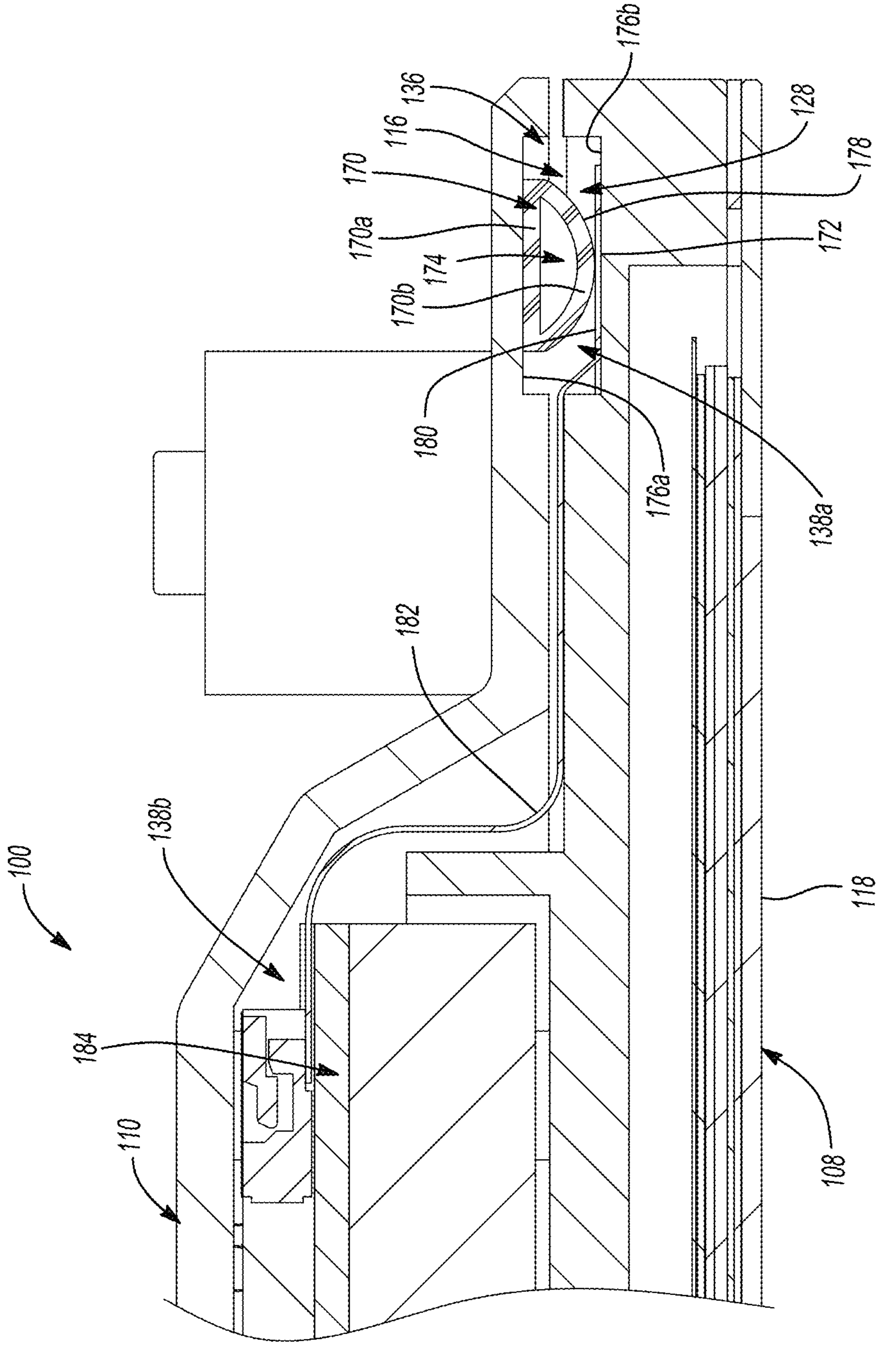
FIG. 5 is a cross-sectional view of a portion of the touch panel display unit of FIG. 1 with the electrode assembly in a rest state.
Figure 6:
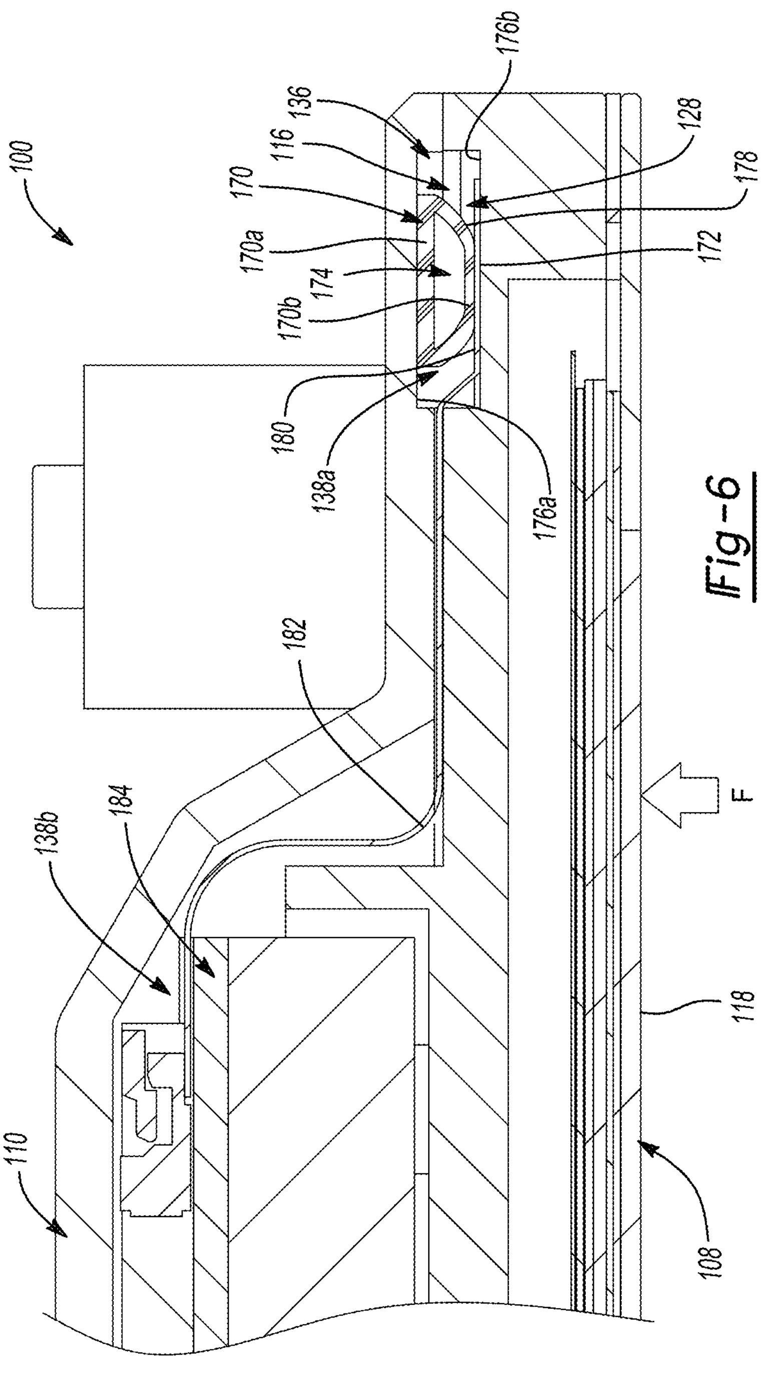
FIG. 6 is a cross-sectional view of a portion of the touch panel display unit of FIG. 1 with the electrode assembly in a displaced state.

With reference to FIGS. 4-6, the electrode assembly 116 is disposed within the compartment 138*a* (FIGS. 5 and 6) of the display unit 100 that is formed by the front and rear housings 108, 110, and is configured to detect displacement of the touchscreen 118 and provide dampening in response to a displacement of the touchscreen 118. The electrode assembly 116 includes a deformable electrode 170 and a sensing electrode 172. Displacement of the touchscreen 118 is achieved by measuring changes in capacitive coupling associated with the deformable electrode 170 and the sensing electrode 172 located between the front and rear housings 108, 110. The deformable electrode 170 generates a restoring force in response to a compression of the deformable electrode 170 based on a corresponding deflection of the actuator 154. In one embodiment, the deformable electrode 170 may have a rectangular shape, for example, and be made of an elastomeric conductive foam material, for example. In other embodiments, the deformable electrode 170 may have a non-rectangular shape depending on the shape of the housings 108, 110 and/or may be made of a conductive rubber material, or any other suitable conductive flexible material configured to cooperate with the sensing electrode 172 to measure changes in capacitive coupling.

As shown in FIGS. 5 and 6, the deformable electrode 170 has a D-shape cross-section and is disposed within the compartment 138*a* formed by the front and rear housings 108, 110 (i.e., the deformable electrode 170 is located at least partially in the recess 128 of the front housing 108 and located at least partially in the recess 136 of the rear housing 110). That is, the deformable electrode 170 extends entirely around the compartment 138*a* formed by the front and rear housings 108, 110 and has a flat wall 170*a* and an arcuate wall 170*b* that cooperate with each other to form a cavity 174 filled with pressurized fluid. In one embodiment, the pressurized fluid is a pressurized gas and may be, for example, pressurized air, nitrogen, or any other suitable gas.

The cavity 174 is filled with pressurized fluid via a fluid device (not shown) including a valve (not shown), a fluid reservoir (not shown), a pump (not shown), and a fluid line (not shown) configured to fluidly connect the fluid reservoir to the cavity 174. In this way, prior to assembly of the display unit 100, pressurized fluid contained in the fluid reservoir is pumped into the cavity 174 of the deformable electrode 170 via the fluid line. The valve may increase of decrease the pressure of the fluid entering the deformable electrode 170 based on the elasticity or damping properties desired for the particular application.

The flat wall 170*a* is received in the recess 136 of the rear housing 110 and may extend parallel to the front and rear housings 108, 110. In the example illustrated, the flat wall 170*a* abuts against a flat surface 176*a* defining the recess 136. In some embodiments, the flat wall 170*a* may be bonded to the flat surface 176*a* defining the recess 136 using an adhesive material. The arcuate wall 170*b* may be partially received in the recess 136 of the rear housing 110 and is at least partially received in the recess 128 of the front housing 108. In the example illustrated, a portion of the arcuate wall 170*b* engages (i.e., presses against) a flat surface 176*b* defining the recess 128 of the front housing 108 by way of the sensing electrode 172. When the touch surface 118 is displaced as described above, the deformable electrode 170 is moved from a rest position (FIG. 5) in which a portion of an arcuate surface 178 of the arcuate wall 170*b* contacts the sensing electrode 172 to a deformable position (FIG. 6) in which a greater portion of the arcuate surface 178 of the arcuate wall 170*b* contacts the sensing electrode 172.

The sensing electrode 172 is received in the recess 128 of the front housing 108 and extends parallel to the front and rear housings 108, 110. The sensing electrode 172 has a planar shape and abuts against the flat surface 176*b* defining the recess 128 such that the sensing electrode 172 is positioned between the deformable electrode 170 and the front housing 108. In some embodiments, the sensing electrode 172 may be bonded to the flat surface 176*b* defining the recess 128 using an adhesive material. In some configurations, the sensing electrode 172 may abut against the flat surface 176*a* and the flat wall 170*a* of the deformable electrode 170 may abut against the flat surface 176*b*. The sensing electrode 172 is aligned with the deformable electrode 170 and has a thickness that is less than a thickness of the deformable electrode 170. In some embodiments, a contact surface 180 of the sensing electrode 172 may be provided with an electrical insulator layer (not shown). In this way, the electrical insulator layer inhibits the overlying deformable electrode 170 from coming into direct electrical contact with the sensing electrode 172 when the deformable electrode 170 is pressed against the sensing electrode 172 during displacement of the touchscreen 118 as described above. The insulator layer may include a plastic film or layer of plastic/resin encapsulant over the sensing electrode 172.

In the example illustrated, the sensing electrode 172 is provided by a conductive trace deposited on the flat surface 176*b* defining the recess 128. The sensing electrode 172 may be a copper foil bonded to the flat surface 176*b*. Conductive traces 182 (FIGS. 4-6) may be deposited at ends of the sensing electrode 172 and may extend from the sensing electrode 172 to the Printed Circuit Board (PCB) 184 mounted to the rear housing 110. Stated differently, conductive traces 182 are deposited on the sensing electrode 172, the front housing 108, and the PCB 184, thus, electrically connecting the sensing electrode 172 and the PCB 184 to each other. In one form, the conductive traces 182*a*, 182*b* may be copper foil bonded to a portion of the sensing electrode 172, the rear surface 126 of the front housing 108, and the PCB 184. In another embodiment, the conductive traces 182*a*, 182*b* may be wires extending between and electrically coupled to the sensing electrode 172 and the PCB 184, thereby electrically connecting the sensing electrode 172 and the PCB 184 to each other.

With reference to FIG. 5, the electrode assembly 116 is in a rest state with no load/force applied to the touchscreen 118. Thus, the deformable electrode 170 is not compressed (or not deformed) and is in a rest position based on the elasticity or damping properties desired for the particular application (i.e., based on the predetermined pressure of the pressurized fluid contained in the cavity 174 of the deformable electrode 170). In the rest position, a portion of the arcuate surface 178 of the arcuate wall 170*b* contacts the sensing electrode 172. In some configurations, the deformable electrode 170 may be under slight compression when the electrode assembly 116 is in the rest state, thereby accommodating variations in the geometry of the display unit 100 arising from manufacturing tolerances.

With reference to FIG. 6, the electrode assembly 116 is in a displaced state in which a load/force F is applied to the touchscreen 118. The load/force may be provided by a finger of a user, for example. In the displaced state, the deformable electrode 170 is compressed (or deformed) and is in a deformed position. In the deformed position, a greater portion of the arcuate surface 178 is pressed against the sensing electrode 172 compared to the rest position causing the arcuate surface 178 to flatten against the sensing electrode 172. The capacitive coupling between the deformable electrode 170 and the sensing electrode 172 increases when the force is applied. The controller 117 is configured to measure characteristics of the capacitive coupling associated with the deformable and sensing electrodes 170, 172, thereby allowing a determination as to whether a displacement has occurred.

It should be understood that there are various ways in which a characteristic of the capacitive coupling between the deformable electrode 170 and the sensing electrode 172 can be measured. For example, the mutual capacitive coupling between the deformable electrode 170 and the sensing electrode 172 could be measured by applying a drive signal to one of the electrodes 170, 172 and measuring the extent to which the drive signal is coupled to the other electrode 170, 172. In another example, the self-capacitance of one of the electrodes 170, 172 could be measured with respect to a reference potential while the other electrode 170, 172 is connected to the reference potential (e.g., a system ground or other system reference potential). In yet another example, one of the electrodes 170, 172 may include two components which are capacitively coupled to one another. That is, the sensing electrode 172 may be replaced with a sensing electrode including a pair of parallel conductors which are insulated from one another but in a relatively close proximity on the front housing 108 with a gap between them underlying the deformable electrode 170. The mutual capacitive coupling between the two conductors could be measured by applying a drive signal to one of the conductors and measuring the extent to which the drive signal is coupled to the other of the conductors. The component of the drive signal coupled between the electrodes will generally reduce as the overlying deformable electrode 170 is compressed onto them under the applied load/force.

With reference to FIG. 7, a controller 117 is configured to operate the display unit 100 in a displacement mode in which the display unit 100 is configured to sense displacement of the touchscreen 118. The controller 117 includes measuring module 117*a* and processing module 117*b*.

The measuring module 117*a* is configured to measure a capacitance characteristic associated with the electrodes 170, 172 (e.g., measure of mutual capacitance between the electrodes 170, 172 or the self-capacitance of one of the electrodes 170, 172). The measuring module 117*a* may be coupled to the deformable electrode 170 and the sensing electrode 172 in a number of ways according to different embodiments. Connections between the measuring module 117*a* and the respective electrodes 170, 172 can be performed, for example, using appropriate wiring and/or conductive traces. In another embodiment, the measuring module 117*a* may be configured to measure a self-capacitance of the sensing electrode 172 while the deformable electrode 170 is connected to a system reference potential. Measuring the self-capacitance of the sensing electrode 172 may be performed by applying a drive signal to the sensing electrode 172 that varies in time relative to system ground (or other reference potential) and determining the extent to which the drive signal is capacitively coupled to the system ground via conductive paths in the vicinity of the sensing electrode 172 that are connected to the system ground potential. The presence of the deformable electrode 170 provides a contribution to the extent to which the sensing electrode 172 is capacitively coupled to the reference potential. Furthermore, the magnitude of this capacitive coupling depends on the separation (offset) between the sensing electrode 172 and the deformable electrode 170. Thus, the magnitude of the capacitive coupling between the two electrodes 170, 172 depends on the volume between them. Therefore, the self-capacitance of the sensing electrode 172 changes when the touchscreen 118 is displaced under load thereby compressing the deformable electrode 170 towards the sensing electrode 172.

The processing module 117*b* is configured to receive indications of the measured capacitance characteristic of the sensing electrode 172 from the measuring module 117*a* and determine a displacement of the touchscreen 118. In some embodiments, the processing module 117*b* may be configured to determine an absolute value for a displacement, for example, by converting an individual capacitance measurement (or average of several capacitance measurements) to a displacement offset based on a calibration function. The calibration function may, for example, be based on modelling or established in an initial setup procedure in accordance with conventional capacitance measurement techniques. In particular, a baseline value corresponding to a measurement of the relevant capacitance characteristic of the sensing electrode 172 when there is no displacement may be established at various times, for example, when the display unit 100 is initially turned on. The calibration function may then be used to convert differences in capacitance measurement from the baseline measurement to corresponding displacements.

In another embodiment, the processing module 117*b* may be configured to provide a binary indication as to whether or not there has been a displacement greater than a threshold displacement. For example, the processing module 117*b* may be configured to identify when there has been a change in measured capacitance that is greater than a pre-defined threshold, and to determine that this corresponds with a displacement by more than an amount corresponding to the pre-defined threshold displacement. An appropriate value for the pre-defined threshold in any given implementation can be established with regard to the extent of displacement which is desired to trigger a determination that displaced has occurred, and may be dynamically chosen to suit a given application. It should be understood that a self-capacitance approach such as described above could similarly be adopted with the measuring module 117*a* instead configured to measure a self-capacitance of the deformable electrode 170 while the sensing electrode 172 is connected to a system reference potential. That is, the connections to the deformable electrode 170 and the sensing electrode 172 could be reversed.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A touch panel display unit comprising:

a front housing including a touch surface configured to be displaced in response to a force acting on the touch surface; and an electrode assembly configured to detect displacement of the touch surface and provide dampening in response to a displacement of the touch surface, the electrode assembly including a deformable electrode defining a cavity filled with a pressurized fluid, wherein the deformable electrode is configured to adjust a state of elasticity or dampening properties based on a particular application.

2. The touch panel display unit of claim 1, wherein the fluid is pressurized air.

3. The touch panel display unit of claim 1, wherein the deformable electrode includes a flat wall and an arcuate wall, and wherein the arcuate wall is engaged with the front housing.

4. The touch panel display unit of claim 3, wherein the electrode assembly includes a sensing electrode located between the arcuate wall of the deformable electrode and the front housing, the sensing electrode engaging the arcuate wall and the front housing.

5. The touch panel display unit of claim 4, wherein when the touch surface is displaced, the deformable electrode is moved from a rest position in which a first area of the arcuate wall engages the sensing electrode to a deformable position in which a second area of the arcuate wall engages the sensing electrode, the second area being greater than the first area.

6. The touch panel display unit of claim 4, further comprising a rear housing including a first recess formed in a first surface thereof, the front housing includes a second recess formed in a second surface that faces the first surface, the deformable electrode is located partially in the first recess and the sensing electrode is located entirely in the second recess.

7. The touch panel display unit of claim 1, wherein the deformable electrode is made of an elastomeric conductive foam.

8. The touch panel display unit of claim 1, further comprising a rear housing secured to the front housing, the deformable electrode is located at a periphery of the front and rear housings.

9. The touch panel display unit of claim 1, further comprising a drive unit configured to displace the touch surface in response to the force acting on the touch surface.

10. The touch panel display unit of claim 9, wherein the drive unit comprises a piezo actuator.

11. The touch panel display unit of claim 9, further comprising a rear housing secured to the front housing, the front and rear housings cooperate with each other to define a first compartment and a second compartment that surrounds the first compartment, the drive unit disposed in the first compartment and the deformable electrode disposed in the second compartment.

12. The touch panel display unit of claim 1, further comprising a rear housing secured to the front housing, the rear housing includes a first recess formed in a first surface and the front housing includes a second recess formed in a second surface that faces the first surface, the deformable electrode is located partially in the first and second recesses.

13. The touch panel display unit of claim 1, wherein the deformable electrode extends around an entire periphery of the front housing.

14. A touch panel display unit comprising:

a rear housing;

a front housing cooperating with the rear housing to define a first compartment and a second compartment that surrounds the first compartment, the front housing including a touch surface configured to be displaced in response to a force acting on the touch surface; and an electrode assembly disposed within the second compartment, the electrode assembly configured to detect displacement of the touch surface and provide dampening in response to a displacement of the touch surface, the electrode assembly includes:

a deformable electrode including a flat wall engaged with the rear housing and an arcuate wall, the deformable electrode also defining a cavity filled with a pressurized fluid; and a sensing electrode located between the arcuate wall of the deformable electrode and the front housing, the sensing electrode engaging the arcuate wall and the front housing, wherein the deformable electrode is configured to adjust a state of elasticity or dampening properties based on a particular application.

15. The touch panel display unit of claim 14, wherein the pressurized fluid is pressurized air.

16. The touch panel display unit of claim 14, further comprising a drive unit disposed within the first compartment and configured to displace the touch surface in response to a force being applied to the touch surface.

17. The touch panel display unit of claim 14, wherein the deformable electrode is made of an elastomeric conductive foam.

18. The touch panel display unit of claim 14, wherein the rear housing includes a first recess formed in a first surface and the front housing includes a second recess formed in a second surface that faces the first surface, and wherein the first recess and the second recess cooperate with each other to define the second compartment when the rear housing and the front housing are connected to each other.

19. The touch panel display unit of claim 14, wherein when the touch surface is displaced, the deformable electrode is moved from a rest position in which a first area of the arcuate wall engages the sensing electrode to a deformable position in which a second area of the arcuate wall engages the sensing electrode, the second area being greater than the first area.

20. A touch panel display unit comprising:

a rear housing including a first recess formed in a first surface;

a front housing including a second recess formed in a second surface that faces the first surface, the front housing including a touch surface configured to be displaced in response to a force acting on the touch surface;

a drive unit configured to displace the touch surface in response to the force acting on the touch surface; and an electrode assembly located between the rear and front housings, the electrode assembly configured to detect displacement of the touch surface and provide dampening in response to a displacement of the touch surface, the electrode assembly includes:

a deformable electrode partially disposed within the first recess and made of an elastomeric conductive foam, the deformable electrode includes a flat wall engaged with the rear housing, and an arcuate wall, the flat wall and the arcuate wall cooperate with each other to define a cavity filled with pressurized air; and a sensing electrode disposed within the second recess and located between and engaging the arcuate wall of the deformable electrode and the front housing, wherein when the touch screen is displaced, the deformable electrode is moved from a rest position in which a first area of the arcuate wall engages the sensing electrode to a deformable position in which a second area of the arcuate wall engages the sensing electrode, the second area being greater than the first area.

* * * * *